United States Patent [19]

Köberle

[11] Patent Number: 4,522,077
[45] Date of Patent: Jun. 11, 1985

[54] FLOW MEASURING SYSTEM INCLUDING A VENTURI

[76] Inventor: Karl Köberle, Panoramastrasse 14, D-7980 Ravensburg 19, Fed. Rep. of Germany

[21] Appl. No.: 505,400

[22] Filed: Jun. 17, 1983

[30] Foreign Application Priority Data

Jun. 28, 1982 [DE] Fed. Rep. of Germany ....... 3224285

[51] Int. Cl.³ .............................................. G01P 5/14
[52] U.S. Cl. ................................................ 73/861.63
[58] Field of Search ........... 73/861.11, 861.12, 861.58, 73/861.61, 861.63, 861.64

[56] References Cited

U.S. PATENT DOCUMENTS

| 1,917,974 | 7/1933 | Inglis et al. | 73/861.58 X |
| 3,374,674 | 3/1968 | Schwartzman | 73/861.63 |
| 3,528,289 | 9/1970 | Schwartzman | 73/861.63 |
| 3,529,469 | 9/1970 | Gauthier | 73/861.64 X |
| 3,766,779 | 10/1973 | Hoffman | 73/861.61 |
| 4,358,964 | 11/1982 | Otsuka | 73/861.12 X |
| 4,470,309 | 9/1984 | Wada | 73/861.12 |

FOREIGN PATENT DOCUMENTS

| 1110892 | 7/1961 | Fed. Rep. of Germany . | |
| 2443610 | 3/1976 | Fed. Rep. of Germany | 73/861.58 |
| 2442155 | 11/1976 | Fed. Rep. of Germany | 73/861.63 |
| 2751103 | 5/1979 | Fed. Rep. of Germany . | |
| 1026602 | 4/1966 | United Kingdom | 73/861.63 |
| 449244 | 4/1975 | U.S.S.R. | 73/861.63 |
| 514198 | 1/1977 | U.S.S.R. | 73/861.63 |

Primary Examiner—Robert Spitzer
Attorney, Agent, or Firm—Spencer & Frank

[57] ABSTRACT

A fluid flow measuring system composed of: a venturi connected to conduct the fluid whose flow is to be measured and having two outlet ports between which a pressure differential proportional to such fluid flow is created; a movably mounted measuring element having a selected zero position and connected to the venturi to be subjected to a displacement force corresponding to the pressure differential; a transducer unit associated with the measuring element for producing an electrical signal representative of the displacement of the measuring element from its zero position; a regulating device having a signal input connected to receive the electrical signal, and a signal output, and presenting a transfer characteristic having an integrating component such that the signal at the signal output is representative of the magnitude and duration of displacement of the measuring element from its zero position; a signal squaring circuit connected to the regulating device for generating a control signal dependent on the square of the signal at the output of said regulating device; and a hysteresis-free electromagnetic system connected to apply to the measuring element, in response to the control signal, a magnetic displacement force of a magnitude and direction to cause the measuring element to reach its zero position.

9 Claims, 7 Drawing Figures

4,522,077

FLOW MEASURING SYSTEM INCLUDING A VENTURI

BACKGROUND OF THE INVENTION

The present invention relates to a flow-measuring system including a venturi and a movably mounted measuring element which is charged by the pressure differential across the venturi, with a counterforce acting against the deflection force generated by the pressure differential and the measuring element being stabilized in its zero position independently of these forces by a position dependent resetting force.

A flow measuring system of this type is disclosed in German Published Patent Application DE-AS No. 1,110,892. The measuring element is the armature of an electromagnet. It is guided by means of a bellows and a diaphragm whose resetting forces stabilize it in a zero position. If fluid flows and the armature is thus deflected from its zero position, a contact switches on the electromagnet. The resulting magnetic pulling force repeatedly opens the contact in rapid succession, with the average current developing with the aid of smoothing members holding the vibrating armature in equilibrium against the deflection force at the switching limits of the contact. A resonant core magnetic field gauge is installed in a measuring air gap of the electromagnet and emits a measuring signal at a frequency which is proportional to the field intensity. Since the field intensity is proportional to the square root of the magnetic force, the above-mentioned frequency constitutes an output value which is proportional to the flow rate.

Because of the use of a magnetic field measuring device, however, this known flow measuring system is very complicated and expensive. The continous vibratory movement of the measuring element as a result of the two-point regulation adversely influences measuring accuracy. Also, in many cases the display of the output signal which appears in the form of a frequency requires high component expenditures.

SUMMARY OF THE INVENTION

It is an object of the present invention to provide a simple and accurate flow measuring system with which even small flow quantities can be detected and which furnishes a voltage proportional to the quantity of fluid flow which can be displayed directly or can be used to optimize a process.

The above and other objects are achieved, according to the invention, by the provision of a fluid flow measuring system comprising: a venturi connected to conduct the fluid whose flow is to be measured and having two outlet ports between which a pressure differential proportional to such fluid flow is created; a movably mounted measuring element having a selected zero position and connected to the venturi to be subjected to a displacement force corresponding to the pressure differential; transducer means associated with the measuring element for producing an electrical signal representative of the displacement of the measuring element from its zero position; a regulating device having a signal input connected to receive the electrical signal, and a signal output, and presenting a transfer characteristic having an integrating component such that the signal at the signal output is representative of the magnitude and duration of displacement of the measuring element from its zero position; signal squaring means connected to the regulating device for generating a control signal dependent on the square of the signal at the output of the regulating device; and a hysteresis-free electromagnetic system connected to apply to the measuring element, in response to the control signal, a magnetic displacement force of a magnitude and direction to cause the measuring element to reach its zero position.

When the measuring element is initially deflected due to the pressure differential, the output signal increases and correspondingly also the counterforce developed therefrom. The counterforce drives the measuring element back to its zero position, with the output signal and the counterforce retaining their attained values. Thus the measuring element does not vibrate but always comes to rest in its zero position as a result of the regulation as soon as the flow quantity no longer changes.

The output signal is preferably a direct voltage which is precisely proportional to the flow rate to the extent that the counterforce is precisely a square function of the output signal. The latter can be realized without difficulty with the aid of known squaring networks. The influence of hysteresis is eliminated in that an iron-free magnet system is used which operates according to the principle of a moving coil measuring system. If the measuring element is in its zero position, the magnetic force is precisely proportional to the excitation current.

Experience has shown that it is difficult to hold a measuring element precisely in a defined zero position with the aid of spring elements. Temperature and aging influences are also a factor and impact stresses must be kept away if possible.

It is therefore proposed to design the measuring element as a freely movable piston. Although German Laid-Open Patent Application DE-OS No. 2,751,103 discloses a freely movable piston in a fuel consumption gauge for internal-combustion engines, this piston has no defined zero position and does not come to rest when it is in use as a consumption gauge.

The above-mentioned hysteresis-free magnet system can be realized in that the measuring element is provided with, or constitutes, a permanent magnet which moves in the magnetic field of at least one fixed coil. This magnet system is used simultaneously to reset the measuring element into its zero position and to precisely fix this zero position.

According to a first embodiment, the measuring element is acted on, on the one hand, by the weight of the measuring element minus the weight of the fluid displaced by it, and, on the other hand, by the force resulting from the interaction between the permanent magnet and a constant excitation current of the coil. The latter force is dependent on the measuring element position. It increases initially as the permanent magnet approaches the coil, and then, after reaching a maximum, decreases as the permanent magnet enters the coil. The arrangement is now made in such a way that the measuring element is able to move vertically and is pulled upwardly into the coil. The stable zero position is at the point where the upwardly decreasing and downwardly increasing magnetic force is in equilibrium with the constant force of gravity.

This arrangement is particularly suited for use as a fuel consumption gauge in motor vehicles. The suddenly occurring vertical accelerations in such an environment, which thus interfere with the equilibrium, are only of short duration; their influence is of a higher frequency and can therefore be suppressed, if necessary, by means of a switching arrangement which serves as a lowpass filter. Advantageously, however, horizontal accelerations do not influence the measuring process at all.

According to a second embodiment, the weight of the measuring element provided with the permanent magnet is selected to be equal to the weight of the displaced fluid and the resetting force is generated in cooperation with the permanent magnets and two oppositely acting coils carrying constant direct currents. To set the weight of the measuring element, appropriate lightweight materials can be used or the measuring element can be designed as a hollow body. Instead of gravity being a component of the resetting force, the electromagnetic force of the second, counteracting coil becomes effective here. The zero position is at the point where the two magnetic forces cancel one another out.

Although this second embodiment of the flow measuring system is limited to fluids having a prescribed density, it has considerable advantages. The influence of gravity is eliminated. The arrangement can be installed in any orientation. The measurement is completely independent of acceleration. Therefore it can also be used in gravity-free space.

Advisably, the position sensor which furnishes the input value to the regulating device is a photoelectric barrier whose light beam intersects the path of the measuring element. The space filled with the fluid, in which the measuring element moves, must then be provided with light transmitting windows or must be made as a whole as a vessel made of a light transmissive material. Inexpensive electric eye modules including light-emitting diodes are particularly suitable and should be mounted to be adjustable in order to be able to adjust the output voltage of the electric eye module precisely to zero when the measuring element is in the zero position.

A conventional operational amplifier, preferably designed as a proportional-integral (PI) regulator, is suitable as the regulating device. If the fluid damping experienced by the measuring element in the fluid surrounding it is not sufficient, the regulating device may additionally be provided with a differentiating component. For example, in flow measuring systems for gases there may be insufficient damping.

A diode network is advisably used as the signal squaring member connected in series with the regulating device, with the output current of the squaring member, which depends on the output signal of the regulating device in a quadractric manner, feeding a coil cooperating with the permanent magnets of the measuring element. This may be the coil used for resetting, as mentioned above, so that its excitation current is composed of a constant direct current component and an oppositely directed direct current component whose amplitude depends on the output signal of the regulator. Moreover, it is possible to combine the circuits of the squaring member and the current source for the constant resetting current in a common function module.

Two embodiments of the invention will be explained in greater detail below with the aid of the drawings.

DESCRIPTION OF THE PREFERRED EMBODIMENTS

Figure 1:
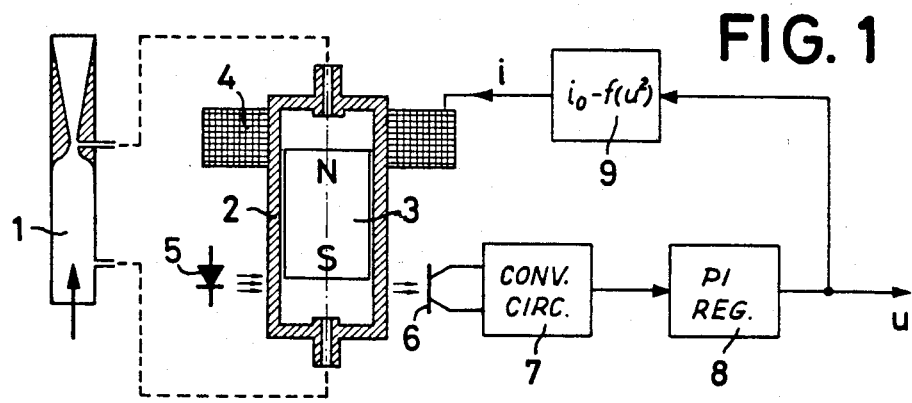
FIG. 1 is a partly schematic and partly cross-sectional view of the entire flow measuring system according to the first embodiment of the invention.

The flow measuring system according to FIG. 1 includes a venturi 1 through which a fluid flows in the direction of the arrow. A hollow cylinder 2 made of a transparent material is provided at its end faces with bores communicating with the bores of venturi 1. A permanent magnet piston 3 is arranged in the hollow cylinder 2 to be freely movable in the axial direction, which is preferably vertical. Its magnetic field is linked to a fixed coil 4 which surrounds the hollow cylinder 2. Likewise fixed to the hollow cylinder 2 is a light emitting diode 5 and a phototransistor 6 which form an electric eye whose beam path is partially covered by the lower edge of piston 3.

The phototransistor 6 is part of a signal converter circuit 7 including resistors which furnishes the input signal for a PI regulator 8. The output voltage u of the PI regulator 8 is fed to a squaring member 9 whose output current i feeds coil 4.

The above-mentioned voltage u forms the output signal of the measuring system. It is proportional to the flow rate through venturi 1 and can be read off at an analog display or can be processed further, e.g. to optimize the operating state of an engine.

Figure 2:
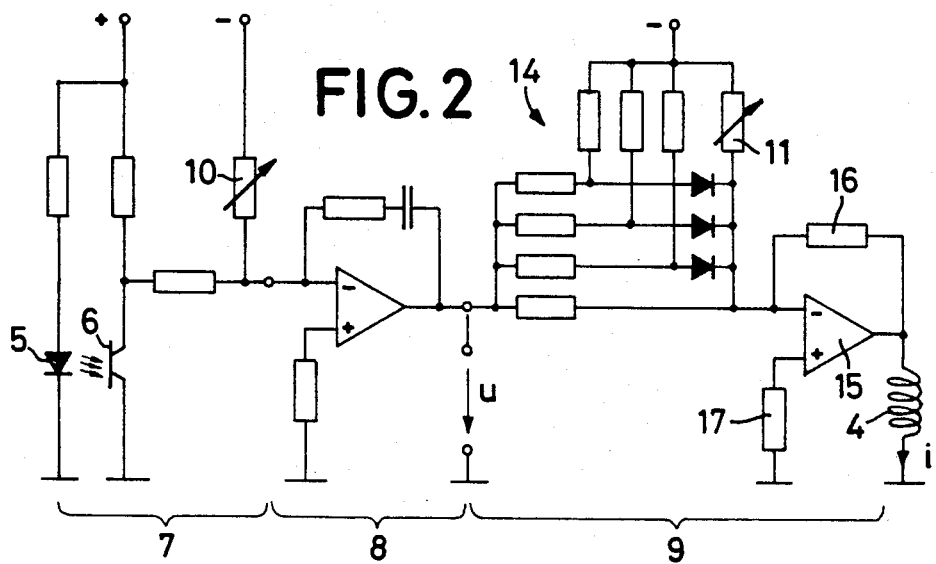
FIG. 2 is a circuit diagram of an embodiment of the electronic portion of the measuring system according to FIG. 1.

In the circuit arrangement according to FIG. 2, a positive and a negative direct operating voltage are supplied to circuit 7 and the negative operating voltage is also supplied to squaring member 9. The circuit arrangement consists of the three circuit units of FIG. 1, as indicated by identical reference numerals. Circuit 7 furnishes an output voltage in dependence on the position of piston 3, and on the setting of a potentiometer 10. In particular, the voltage can be set in such a manner that it is zero if piston 3 is in its rest position and no fluid is flowing.

A conventional operational amplifier is used as the PI regulator 8.

The squaring member 9 is a nonlinear function module including a resistor-diode network, an operational amplifier 15 and a potentiometer 11 at which a constant component current $i_0$ can be set for the output current i. The output of network 14 is connected to the inverting input of amplifier 15, while the noninverting input of amplifier 15 is connected to ground via a resistor 17. A feedback resistor 16 is connected between the output and inverting input of amplifier 15.

Figure 3:
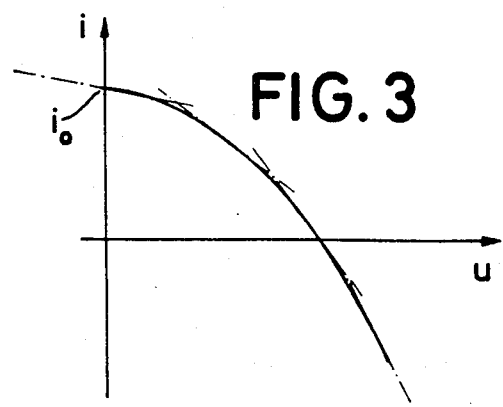
FIG. 3 is a diagram of the relationship between the regulating device output voltage u and the coil excitation current i of FIG. 1.

FIG. 3 shows that, in the case where u=0, the output current i is equal to the component current $i_0$. The other component current has a negative value and is proportional to the square of the voltage u. If, thus, the value of u increases, the total current i is reduced and finally it even reverses its polarity. The desired parabolic shape can be approximated with sufficient accuracy by the diode network shown in FIG. 2. The breaks in the polygonal line shown in chain lines are in reality rounded off because the diode characteristics, in fact, have no bend.

In principle, piston 3 could also be caused by spring elements to take up a certain zero or starting position if the fluid does not flow and thus no differential pressure acts on piston 4.

Figure 4A:
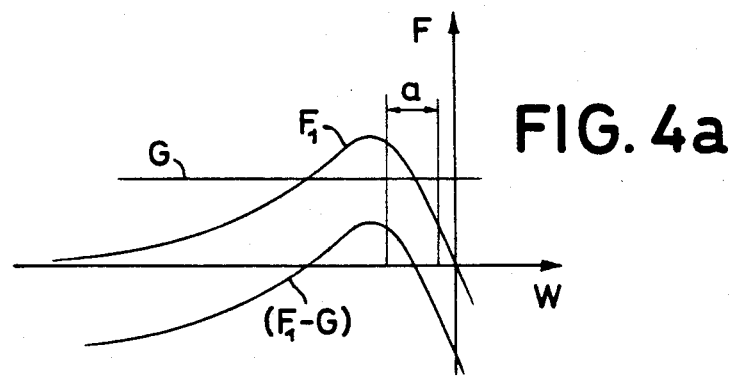
FIGS. 4a and 4b are, respectively, a graph of the forces participating in the zero position stabilization of the measuring element of FIG. 1, and a pictorial view of the measuring element and coil.
Figure 4B:
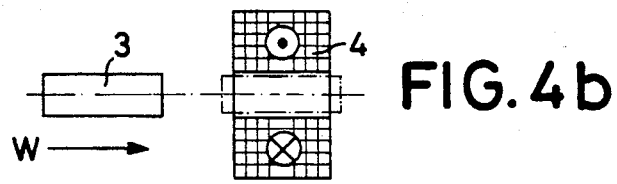

Another type of zero position stabilization is proposed in FIGS. 4, it being assumed that the hollow cylinder is arranged in a vertical orientation and coil 4 is at the top, as shown in FIG. 1. The gravity force G, reduced due to the upward flow of fluid in venturi 1, pulls the piston 3 downwardly. On the other hand, coil 4, which is excited by a constant component current $i_0$, is pulled upwardly with a force $F_1$. These two forces are plotted in FIG. 4a over the travel path W of piston 3. In FIG. 4b coil 4 and piston 3 are shown once more in a schematic representation to illustrate the direction of movement and effect, respectively.

The magnetic force $F_1$ initially increases as piston 3 approaches coil 4. If, during this movement, the front portion of piston 3 enters into coil 4, the magnetic force reaches its maximum to then decrease again to zero when piston 3 becomes centered in coil 4, as shown by chain lines. Gravity G, however, is independent of the piston position. The difference between both forces, as shown in FIG. 4a by curve $F_1-G$ intersects the zero force line at two points.

The system is dimensioned such that the path of movement of piston 3 is limited to region a straddling the right-hand, stable point of intersection between the curve $F_1-G$ and the zero force line. The result is that the piston sets itself to precisely the height position in which the forces acting on it are in equilibrium. This is its zero position. If the piston is deflected toward the top or bottom, the resulting differential force acting downwardly or upwardly, respectively, pulls it back into the zero position.

Under this condition, the above-described flow measuring system operates as follows: as long as there is no fluid flow, piston 3 takes on a zero position as determined also by the randomly developing total excitation current 1. By adjustment of potentiometer 10, the zero position is first brought into the most favorable location within the operating range of the electric eye. Then, by way of adjustments at resistor 11, the current $i_0$ is brought to a value such that the output voltage u is made zero. The excitation current $i=i_0$ now flows in coil 4. As soon as a fluid flow begins, the pressure difference between the ends of piston 3 lifts piston 3. As a result, somewhat more light passes to phototransistor 6 and the output signal of the circuit 7 becomes negative. The output voltage u changes in a positive direction and the total excitation current i, and with it the magnetic force $F_1$ decreases. The process is completed when the piston 3 has returned to its starting position and the output signal of circuit 7 is thus zero again. During the process, the voltage u has taken on a value other than zero which it retains since it must keep the current i to a lesser value.

Figure 5A:
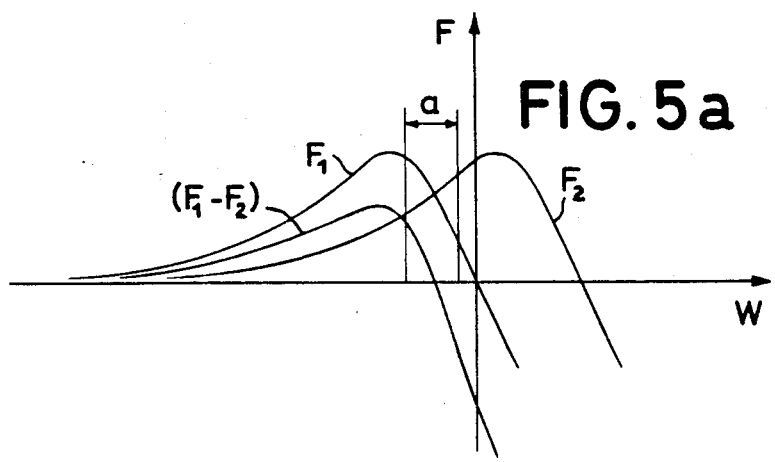
FIGS. 5a and 5b are views similar to those of FIGS. 4a and 4b for a measuring element cooperating with two coils according to the second embodiment of the invention.
Figure 5B:
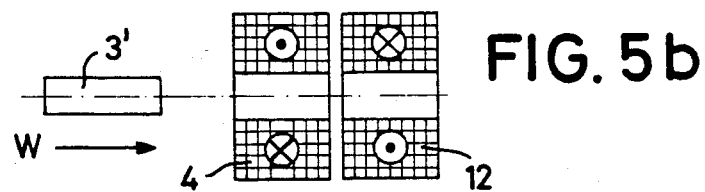

FIGS. 5 show the zero position stabilization in another embodiment employing, as shown in FIG. 5b, two coils 4 and 12 and a piston 3' which together with its permanent magnet has such a weight that weight and buoyancy in the fluid cancel one another out. The downward magnetic force $F_2$ produced by the coaxially arranged second coil 12 here takes the place of the weight. This coil 12 is likewise fed by a constant direct current from a separate source. However, the coil is polarized in the opposite direction. The curve $F_1-F_2$ in FIG. 5a shows the differential magnetic force. Here again, the range of movement a of piston 3' is placed so that it includes approximately in its center the stable point of intersection of this latter curve with the zero line. Either one of the two constant excitation currents of the two coils may be determined independently; this degree of freedom gives the arrangement a greater amount of structural flexibility.

In a test arrangement according to the first embodiment described above, flowthrough quantity measurements are made with water. The larger and smaller diameters of the venturi 1 were 8.5 mm and 1.4 mm, respectively. The diameter of the magnetic piston 3 was 5 mm. With these dimensions, small flow quantities of the order of magnitude of 1 liter per hour could still be measured satisfactorily. Further constriction of the small flowthrough opening of the venturi and/or enlargement of the piston diameter will probably permit a lower limit for the flowthrough quantities that can still be measured.

It will be understood that the above description of the present invention is susceptible to various modifications, changes and adaptations, and the same are intended to be comprehended within the meaning and range of equivalents of the appended claims.

What is claimed is:

1. A fluid flow measuring system comprising: a venturi connected to conduct the fluid whose flow is to be measured and having two outlet ports between which a pressure differential proportional to such fluid flow is created; a movably mounted measuring element having a selected zero position and connected to said venturi to be subjected to a displacement force corresponding to the pressure differential; transducer means associated with said measuring element for producing an electrical signal representative of the displacement of said measuring element from its zero position; a regulating device having a signal input connected to receive said electrical signal, and a signal output, and presenting a transfer characteristic having an integrating component such that the signal at said output is representative of the magnitude and duration of displacement of said measuring element from its zero position; signal squaring means connected to said regulating device for generating a control signal dependent on the square of the signal at said output of said regulating device; and a hysteresis-free electromagnetic system connected to apply to said measuring element, in response to the control signal, a magnetic displacement force of a magnitude and direction to cause said measuring element to reach its zero position.

2. Flow measuring system as defined in claim 1 wherein said measuring element is a freely movable piston.

3. Flow measuring system as defined in claim 1 wherein said measuring element comprises a permanent magnet and said electromagnetic system comprises at least one fixed coil producing a magnetic field acting on said magnet.

4. Flow measuring system as defined in claim 3 wherein said measuring element is oriented such that the force due to its weight acts on said measuring element in the direction opposite to the force resulting from the pressure differential and to the magnetic force applied by said electromagnetic system.

5. Flow measuring system as defined in claim 3 wherein said measuring element is immersed in a fluid and has a weight equal to the weight of the fluid which it displaces, and said electromagnetic system comprises two coils each connected to receive a direct current and oriented for applying to said measuring element magnetic forces having respectively opposite directions.

6. Flow measuring system as defined in claim 3 wherein said squaring means comprise a diode network connected to said signal output of said regulating device for producing an output current as said control signal, and said output current is supplied to said coil.

7. Flow measuring system as defined in claim 3 wherein said squaring means produces an output current constituted by a component which varies with the square of the signal at said output of said regulating device, and a constant direct current component.

8. Flow measuring system as defined in claim 1 wherein said transducer means comprises a light barrier associated with said regulating device to act as a position sensor and positioned to produce a light beam intersecting the path of movement of said measuring element.

9. Flow measuring system as defined in claim 1 wherein said regulating device is a proportional-integral regulator.

* * * * *